Figure 3:
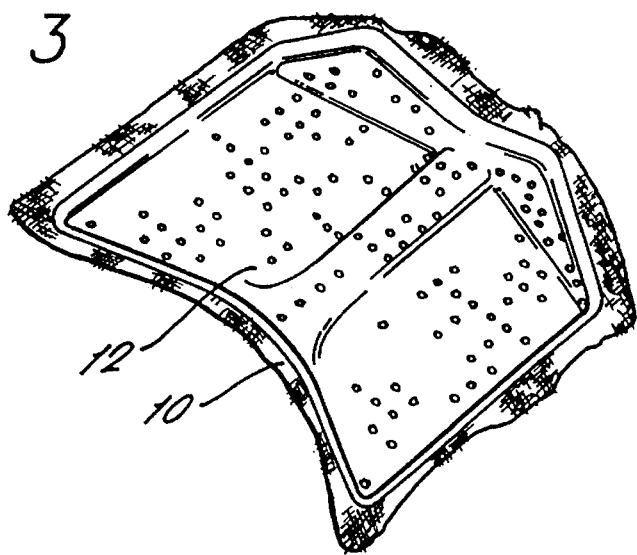

United States Patent [19]

Adams

[11] Patent Number: 5,501,832
[45] Date of Patent: Mar. 26, 1996

[54] METHOD AND APPARATUS FOR FORMING A MOULDED ARTICLE INCORPORATING A REINFORCING STRUCTURE

[75] Inventor: Alfred A. Adams, Norwich, United Kingdom

[73] Assignee: Group Lotus Limited, Norfolk, England

[21] Appl. No.: 238,207

[22] Filed: May 4, 1994

Related U.S. Application Data

[63] Continuation of Ser. No. 820,876, filed as PCT/GB90/01149, Jul. 25, 1990, abandoned.

[30] Foreign Application Priority Data

Jul. 27, 1989 [GB] United Kingdom ............... 8917142

[51] Int. Cl.$^6$ ................................. B29C 70/44
[52] U.S. Cl. .................. 264/510; 264/316; 425/112; 425/389
[58] Field of Search ................... 264/102, 316, 264/510, 511, 257; 425/504, 517, 521, 388, 389, 405.1, 112; 156/285

[56] References Cited

U.S. PATENT DOCUMENTS

| | | |
|---|---|---|
| 3,559,236 | 2/1971 | Merritt . |
| 3,743,689 | 7/1973 | Saladin ................................. 264/257 |
| 3,817,806 | 6/1974 | Anderson et al. ..................... 264/257 |
| 3,992,238 | 11/1976 | Johns .................................. 264/257 |
| 4,131,664 | 12/1978 | Flowers et al. ..................... 156/285 |
| 4,267,142 | 5/1981 | Lankheet ............................. 264/316 |
| 4,608,220 | 8/1986 | Caldwell et al. . |
| 4,609,519 | 9/1986 | Pichard et al. ...................... 264/257 |
| 4,842,787 | 6/1989 | Chess, Jr. et al. . |
| 4,938,825 | 7/1990 | Macdonald ........................... 156/285 |
| 4,946,640 | 8/1990 | Nathoo ................................. 264/510 |
| 5,108,691 | 4/1992 | Elliott ................................. 156/285 |

FOREIGN PATENT DOCUMENTS

| | | |
|---|---|---|
| 0229441 | 7/1987 | European Pat. Off. . |
| 0243617 | 11/1987 | European Pat. Off. . |
| 2258136 | 8/1975 | France . |
| 2567807 | 1/1986 | France . |
| 1958110 | 5/1971 | Germany . |
| 940407 | 10/1963 | United Kingdom . |
| 1024582 | 3/1966 | United Kingdom . |

*Primary Examiner*—Catherine Timm
*Attorney, Agent, or Firm*—Fulwider Patton Lee & Utecht

[57] ABSTRACT

The invention provides a method of moulding a reinforced structure for use in a subsequent moulding operation to form a moulded article, comprising the steps of heating a fibrous mat (10) formed from fibres held together by a thermoformable binder while between the parts (11) and (12) of a mould tool which parts (11) and (12) are pre-coated with a release agents; bringing the parts of the mould together using a vacuum with the mat (10) between them; allowing the mould tool, with the fibrous mat (10) therein to cool and removing the moulded reinforcing structure thus formed from the mould tool. The parts (11) and (12) of the mould are brought together by placing them in a vacuum forming table (14) and then evacuating the volume enclosed between the sheet (10) spanning the frame (15) and the lower part (13) of the table (14) when both are brought into contact.

18 Claims, 3 Drawing Sheets

FIG. 1
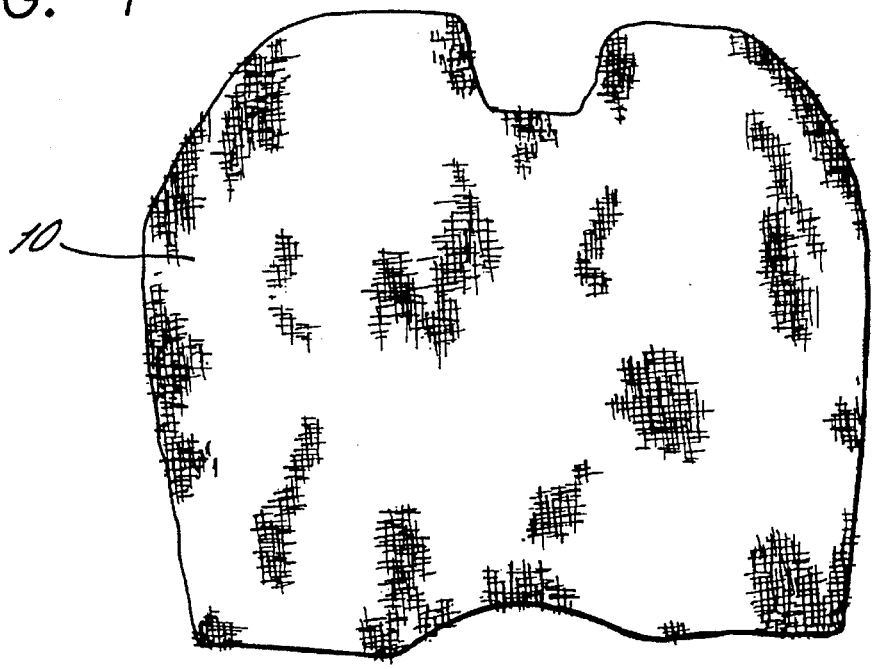
FIG. 2A
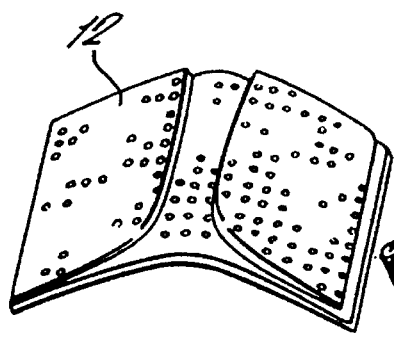
FIG. 2B

METHOD AND APPARATUS FOR FORMING A MOULDED ARTICLE INCORPORATING A REINFORCING STRUCTURE

This application is a continuation of application Ser. No. 07/820,876, filed as PCT/GB90/01149, Jul. 25, 1990, now abandoned.

This invention relates to a method of moulding and to apparatus for carrying out the method.

In EP-A-0229441 there is described a method of moulding in which a reinforcement structure, for example of a glass fibre material, is placed between male and female mould tool parts which together define a cavity defining the shape of the moulded article to be produced, and a quantity of a thermosetting resin is then introduced into the mould tool cavity. The mould tool parts are then urged towards each other thereby to disperse the thermosetting resin throughout the reinforcement structure. The noted steps are carried out at an elevated temperature, for example 55° C., which is maintained after final closing of the mould tool parts together, for a period sufficient to effect curing of the thermosetting resin, after which period the moulded article formed between the mould tool parts can be removed from the mould tool for use or storage for later use.

With this known moulding method the quality of the moulded article produced is dependent upon the uniformity of the fibre reinforcement and the dispersion of the thermosetting resin throughout the reinforcing structure, and since such dispersion occurs while the two parts of the mould tool are closed about the reinforcing structure, it can happen that complete and uniform dispersion does not always occur.

To overcome the problems detailed above, preformed dry reinforcements have been produced, for subsequent use in the moulding process. The preforms are generally fibrous in nature and have a self-supporting shape that approximates to the shape of the finished article or have a shape which allows them to conform with other preforms before moulding of the finished article. However, to date preform preparation has often been labour intensive and have involved costly tooling. Generally, the preforms are manufactured by mechanical press tooling. Furthermore, the processes used have not been very flexible, since different match parts have to be produced for each separate reinforcing structure, to enable the presses to mould the required shape.

The method of the present invention aims to overcome the disadvantages of the prior art by providing a flexible and inexpensive method of producing preformed reinforcement structures. The method does not involve elaborate apparatus and is flexible, the same apparatus being used for different mould tools to form a variety of different shaped preformed structures.

According to this invention there is provided a method of moulding a reinforcing structure for use in a subsequent moulding operation to form a moulded article, comprising heating a fibrous mat coated with a thermoformable binder while located between the parts of a mould tool, which parts are precoated with a release agent; bringing the parts of the mould tool together using a vacuum with the mat between them, allowing the mould tool with the fibrous mat therein to cool and removing the moulded reinforcing structure thus formed from the mould tool.

The present invention further provides a method of preforming a reinforcing structure for embodying in a subsequent moulding operation comprising the steps of; taking a fibrous mat embodying a thermoformable binder; raising the temperature of the mat to render the mat pliable; vacuum forming the mat in a mould tool defining the required shape; and allowing the mat to cool so that the mat becomes self-supporting with the shape defined by the mould tool before removing the mat from the mould tool.

The fibrous mat can be a continuous filament fibre mat or a woven fibre mat.

In a preferred method according to the invention the fibrous mat is initially cut to a template.

Preferably the mould tool is a two-part mould tool and one part of the two-part mould tool defines the required shape of a first side of the mat and the other part defines the required shape of a second side of the mat.

The parts of the mould used in the method are preferably pre-coated with a PTFE release agent.

Preferably the mat is heated in the mould tool before vacuum forming the mat within said mould tool in an oven.

Preferably the vacuum forming is carried out by the steps of; placing the mat in the mould in a vacuum forming table, which vacuum forming table comprises a perforated table and a lid pivotally attached to said table, said lid comprising a frame and a flexible membrane spanning the area within the frame; bringing the lid and the table into contact; and evacuating the volume enclosed between the lid and the table such that pressure is applied to the mat to mould the mat to shape of the mould tool. Where the mould tool is a two-part mould tool, the flexible membrane is drawn down on to the mould tool when the volume between the lid and the table is evacuated such that the two-parts of the mould tool are drawn together to mould the mat to shape of the parts.

The mould tool used preferably comprises a perforated female mould part and a perforated male mould part.

Preferably the perforated female mould is flexible and the male mould is made rigid by bonding it to a supporting structure.

The invention also provides moulding apparatus for use in carrying out a method as hereinbefore described, comprising a perforated mould tool in which the fibrous mat is received; means for heating said mould tool to pre-form the thermoformable material in the mould tool; and vacuum means adapted to receive the mould tool having the fibrous mat therein and operable without further heating to complete moulding of the fibrous mat in the mould tool to form the reinforcing structure.

Preferably the perforated mould tool comprises mutually conforming male and female parts adapted to receive the fibrous mat therebetween.

The mould tool is preferably of high thermal conductivity and is perforated with holes of up to 5 mm diameter and separated from one another by a distance of up to 30 mm from centre to centre of adjacent holes. The mould tool can be formed by closing the tool around a prepared reinforcing structure.

Preferably the vacuum means of the apparatus comprises a perforated table, a vacuum chamber disposed beneath said perforated table, a frame pivotally connected to the perforated table, flexible material attached to said frame and spanning the area within said frame and means for evacuating the volume enclosed between the frames and the table when perforated they are brought into contact.

With the method of this invention there is formed a reinforcing structure which can be used in a subsequent moulding process during which the reinforcing structure is impregnated with resin, to form a high quality moulded article.

Therefore the invention provides a method of moulding a complete article which comprises initial steps as hereinbefore described and further comprises the steps of placing the moulded reinforcing stucture in a second mould tool of a plurality of parts; introducing thermosetting resin into the cavity defined by the second mould tool; urging the parts of the second mould tool together; curing the materials within the second mould tool; and removing the mould second tool parts after a time sufficient to allow curing of the thermosetting resin.

Figure 4:
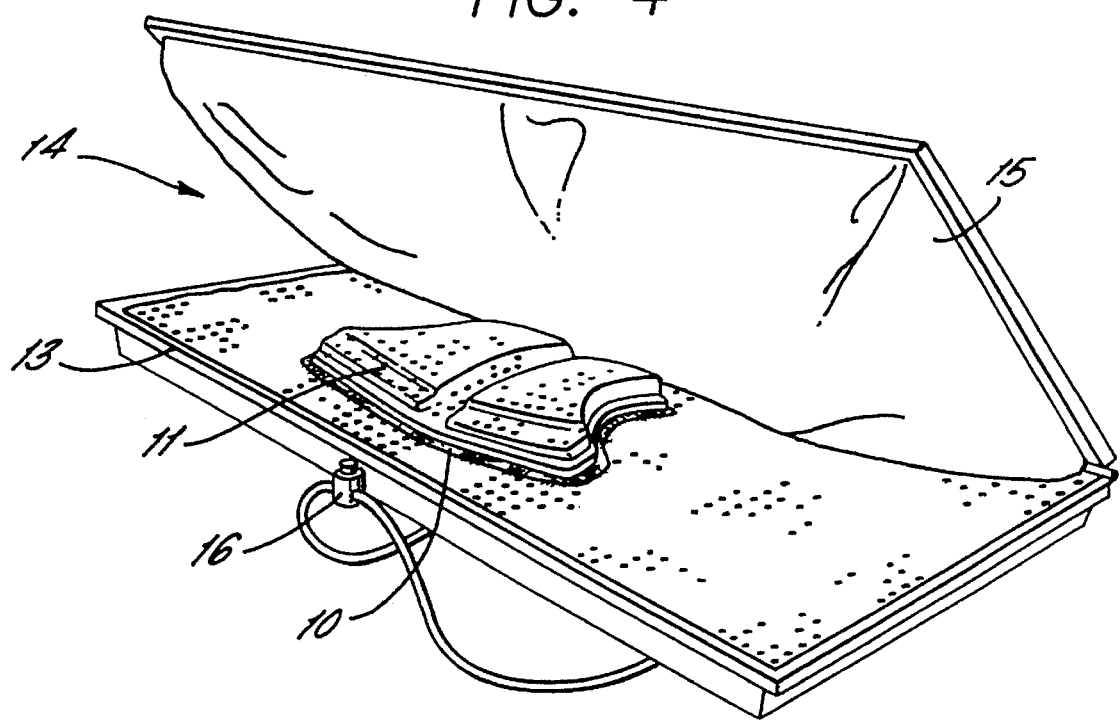
Figure 5:
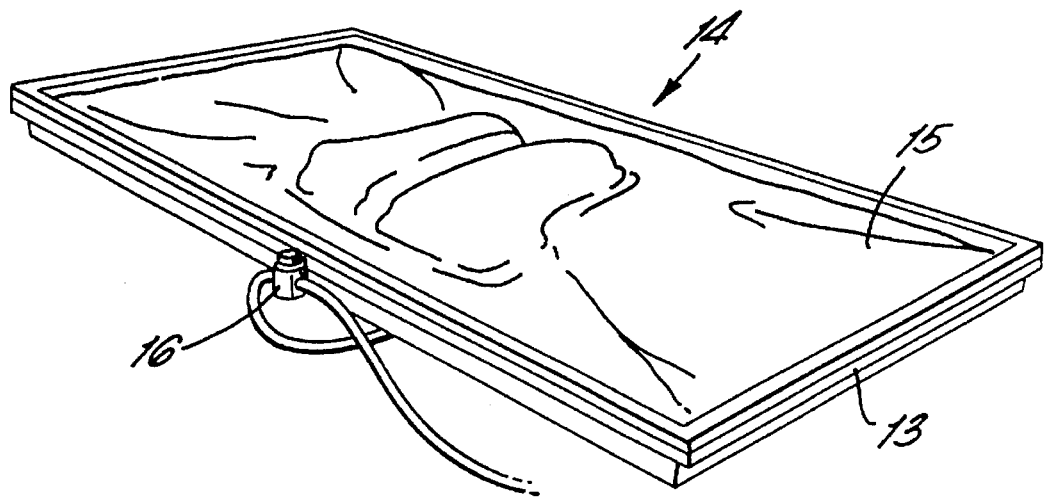
Figure 6A:
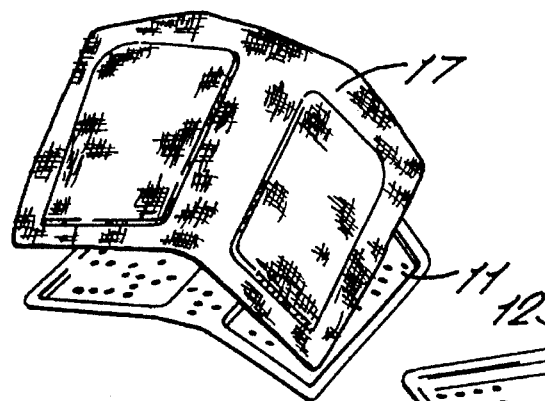
Figure 6B:
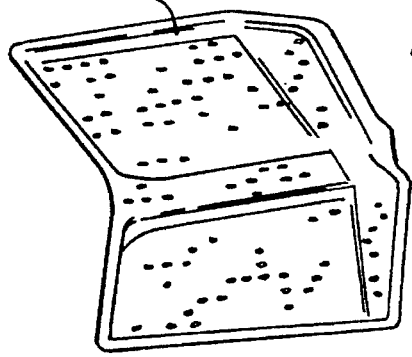

The invention will now be described by way of example with reference to the drawings, in which:

FIG. 1 shows a quantity of thermoformable material to be formed into a reinforcing structure by the method of the invention; and FIGS. 2 to 6 show steps in the manufacture of a reinforcing structure by the method of the invention.

Referring to the drawings, there is shown a quantity of thermoformable material in the form of a sheet 10 of continuous filament fibre matting containing a thermoformable binder. A suitable thermoformable material is "UNIFILO U750". UNIFILO U750 is a trade mark of Vetrotex International used for a random mat of unchopped continuous glass strands held together with a binder having medium solubility in styrene and other monomers. UNIFILO U750 uses a binder of powder polyester of medium solubility in styrene. UNIFILO U750 is supplied worldwide and is supplied in the U.S.A. by Certainteed Corporation. A number of such different materials are commercially available.

Sheet 10 has been cut out according to a template (not shown) to be slightly oversized with respect to the reinforcing structure to be moulded.

The sheet 10 is located between the rigid male and flexible female part 11 of a two-part, perforated mould tool. The female part 11 of the mould tool is then bought together with the loaded male part and, if necessary, clamped or locked to retain the sheet 10 between the mould parts.

Both the male 12 and female 11 mould parts are perforated and therefore constitute perforated mould tooling. Both parts are pre-coated with a PTFE release agent to facilitate disassembly of the mould tool.

The perforated mould tooling 11, 12 is placed in an oven and heated to a temperature at which the binder of the thermoformable sheet 10 softens. For typical binders used with "UNIFILO U750" material, a minimum heating time to achieve a material temperature of 80 degrees Celsius is required. The actual temperature and heating time are determined by the thermoformable binder and type of fibre used in the thermoformable sheet 10, the thickness of the thermoformable sheet 10; and the thermal conductivity of the mould parts 11 and 12.

The initial heating of the mould tooling pre-forms the thermoformable sheet 10 to approximately the shape of the void between the male 12 and female 11 mould parts.

Whilst it is still hot, the mould tooling 11, 12 containing the thermoformable sheet 10 is removed from the oven and placed on the lower part 13 of a vacuum forming table 14. The hinged lid 15 of the vacuum forming table is then closed, thereby switching on the vacuum pump (not shown) of the vacuum forming table 14 by means of a switch 16, which sustains a minimum vaccuum of 25 in Hg (635 mm Hg). The lower part 12 of the vacuum forming table is perforated. A vacuum chamber is located below the lower part 13 of the table 14. The vacuum pump evacuates the vacuum chamber.

The vacuum forming table operates without further heating of the mould tooling 11, 12 and thermoformable sheet 10 to draw the sheet 10 into close conformity with the void between the male 12 and female 11 mould parts.

After a predetermined time, approx. 30 secs, the vacuum pump is switched off and the mould tool is removed from the vacuum table and left to cool for between thirty seconds and a minute for most articles. After this time, the mould tool 11, 12 is removed from the vacuum forming table 14 and any protruding parts of the formed reinforcing structure 17 trimmed back to the joint between the male 12 and female 11 mould parts.

The male and female mould parts are then separated to permit removal of the formed reinforcing structure 17 which can subsequently be used in a moulding process, for example, as described in the above noted EP-A-0229441, in the manufacture of a finished moulded article.

The male 12 and female 11 parts of the mould tooling are preferably of high thermal conductivity to provide for rapid heating and cooling cycles. A suitable material for the mould parts has been found to be a polyester resin containing an aluminium filler. Mould tooling made from this material may itself be formed by closing the mould tool around an existing article which it is required to reproduce.

It has also been found that a suitable pattern of perforations of the mould tooling is to provide 5 mm diameter circular holes having their centres spaced 30 mm from one another in a regular pattern over the parts 11, 12 of the mould tooling. The male part of the mould tooling is preferably rigid. The desired rigidity can be achieved by bonding a lightweight box structure to the underside of the male part of the tooling.

I claim:

1. A method of moulding a reinforcing structure for use in a subsequent moulding operation to form a moulded article, comprising the steps of:

providing a mould tool having first and second mould parts, said first mould part defining a first mould surface and said second mould part defining a second mould surface;

disposing a fibrous mat between said first and second mould parts, said fibrous mat being formed of fibres with a thermoformable binder disposed therebetween;

partially closing said mould tool around said fibrous mat such that said first and second mould surfaces are in face-to-face relationship with said fibrous mat disposed therebetween;

heating said fibrous mat while between said first and second mould parts so as to render said fibrous mat pliable;

placing said mould tool on a vacuum forming table, said vacuum forming table comprising a perforated table and a lid pivotally attached to said table, said lid comprising a frame and a flexible membrane spanning the area within said frame;

bringing the lid and table into contact;

evacuating the volume enclosed between said lid and said perforated table such that pressure is applied to close said first and second mould parts to shape said fibrous mat;

allowing said mould tool and said shaped fibrous mat to cool thereby forming said reinforcing structure;

opening said mould tool and removing the moulded reinforcing structure thus formed from said mould tool.

2. A method as claimed in claim 1, wherein said first mould part is shaped so as to define the contours of a first side of said reinforcing structure and said second mould part is shaped so as to define the contours of a second side of said reinforcing structure.

3. A method as claimed in claim 1, wherein said fibrous mat is a continuous filament fibre mat.

4. A method as claimed in claim 1, wherein said fibrous mat is a woven fibre mat.

5. A method as claimed in claim 1, wherein the step of heating said fibrous mat while between said first and second mould parts comprises heating said mould tool within an oven.

6. A method as claimed in claim 1, wherein said fibrous mat is initially cut to a template.

7. A method as claimed in claim 1, wherein said mould tool is precoated with a release agent.

8. A method as claimed in claim 7, wherein said release agent is a PTFE release agent.

9. A method as claimed in claim 1, wherein said mould tool comprises a perforated female mould part and a perforated male mould part.

10. A method as claimed in claim 9, wherein said perforated female mould part is flexible and said perforated male mould part is made rigid by being bonded to a supporting structure.

11. A method as claimed in claim 1, wherein said mould tool is perforated.

12. A method of forming a moulded article having a reinforcing structure, comprising the steps of:

providing a mould tool having first and second mould parts, said first mould part defining a first mould surface and said second mould part defining a second mould surface;

disposing a fibrous mat between said first and second mould parts, said fibrous mat being formed of fibres with a thermoformable binder disposed therebetween;

partially closing said mould tool around said fibrous mat such that said first and second mould surfaces are in face-to-face relationship with said fibrous mat disposed therebetween;

heating said fibrous mat while between said first and second mould parts so as to render said fibrous mat pliable;

placing said mould tool on a vacuum forming table, said vacuum forming table comprising a perforated table and a lid pivotally attached to said table, said lid comprising a frame and a flexible membrane spanning the area within said frame;

bringing the lid and table into contact;

evacuating the volume enclosed between said lid and said perforated table such that pressure is applied to close said first and second mould parts to shape said fibrous mat;

allowing said mould tool and said shaped fibrous mat to cool thereby forming said reinforced structure;

opening said mould tool and removing the moulded reinforcing structure thus formed from said mould tool;

providing a second mould tool having a plurality of mould parts, said mould parts defining a cavity therebetween;

disposing said moulded reinforcing structure within said second mould tool;

introducing thermosetting resin into said cavity defined by said plurality of mould parts; urging said parts of said second mould tool together;

curing the combination of said thermosetting resin and said moulded reinforcing structure within said second mould tool, and removing said mould tool parts.

13. Moulding apparatus for moulding a reinforcing structure for use in a subsequent moulding operation to form a moulded article, comprising:

a mould tool adapted to receive a fibrous mat and having first and second mould parts, said first mould part defining a first mould surface and said second mould part defining a second mould surface such that, in use, said first and second mould surfaces are arranged in face-to-face relationship with said fibrous mat disposed therebetween;

means for heating said mould tool so as to render said fibrous mat pliable; and vacuum means adapted to receive said mould tool and operative without further heating to close said first and second mould parts and complete the moulding of said fibrous mat, said vacuum means comprising a perforated table, a vacuum chamber communicating with said perforated table, a frame pivotally connected to said perforated table, flexible material attached to said frame and spanning the area within said frame, and means for evacuating the volume enclosed between said frame and said perforated table when said frame and said perforated table are brought into contact.

14. Moulding apparatus in accordance with claim 13, wherein said mould tool comprises mutually conforming male and female mould parts adapted to receive said fibrous mat therebetween.

15. Moulding apparatus in accordance with claim 13, wherein said mould tool is formed of a material having a high thermal conductivity.

16. Moulding apparatus in accordance with claim 13, wherein said mould tool is perforated with holes of up to 5 mm diameter, the centres of adjacent holes being separated from one another by a distance of up to 30 mm.

17. Moulding apparatus in accordance with claim 13, wherein said mould tool is formed by closing said mould tool around a previously prepared reinforcing structure.

18. Moulding apparatus in accordance with claim 13, wherein said mould tool is perforated.

* * * * *

UNITED STATES PATENT AND TRADEMARK OFFICE
CERTIFICATE OF CORRECTION

PATENT NO. : 5,501,832
DATED : Mar. 26, 1996
INVENTOR(S) : Alfred A. Adams

It is certified that error appears in the above-indentified patent and that said Letters Patent is hereby corrected as shown below:

Column 3, line 9, change "2 to 6" to read --2A,2B,3,4,5,6A and 6B--.

Signed and Sealed this

Twenty-seventh Day of August, 1996

Attest:

BRUCE LEHMAN

Attesting Officer    Commissioner of Patents and Trademarks